A. TUITE.
POT FURNACE.
APPLICATION FILED OCT. 11, 1909.
1,015,522.
Patented Jan. 23, 1912.
2 SHEETS—SHEET 2.
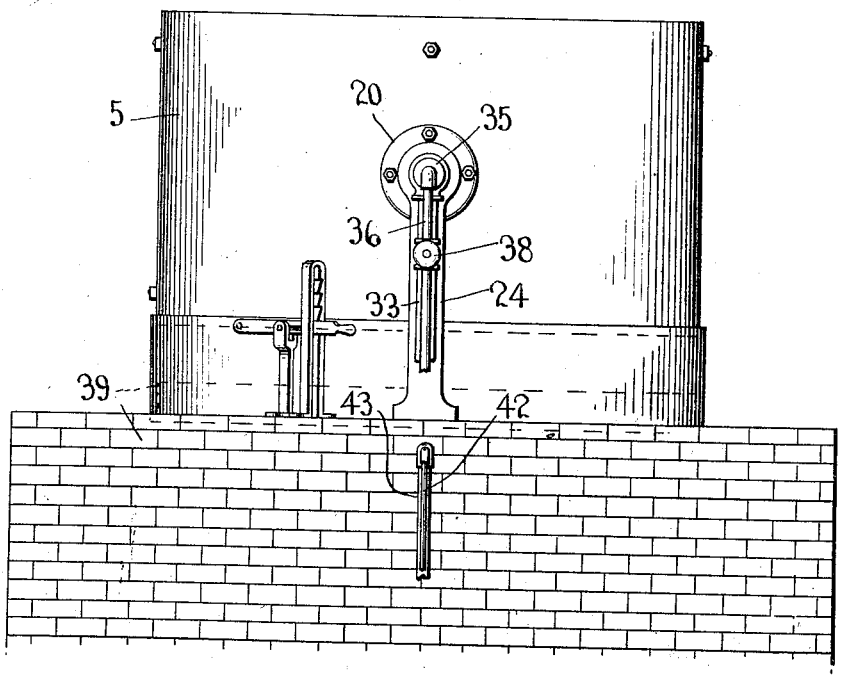
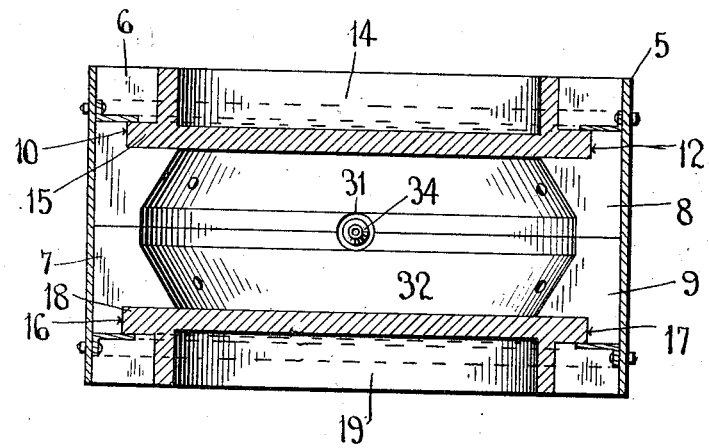
Witnesses
L. B. James
Henry T. Bright
Inventor
Andrew Tuite
By
Attorneys

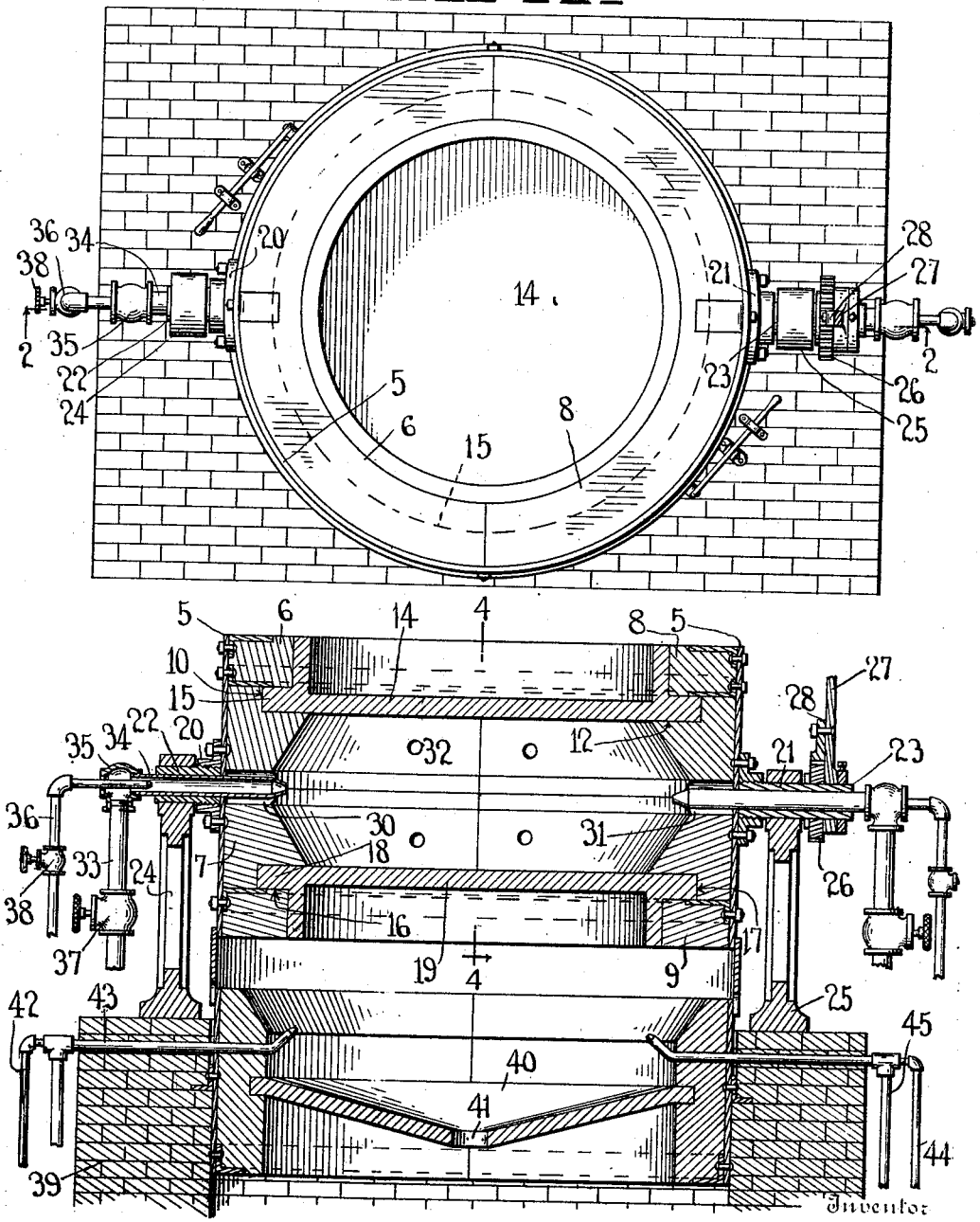

UNITED STATES PATENT OFFICE.

ANDREW TUITE, OF VINCENNES, INDIANA.

POT-FURNACE.

1,015,522.   Specification of Letters Patent.   Patented Jan. 23, 1912.

Application filed October 11, 1909. Serial No. 522,042.

*To all whom it may concern:*

Be it known that I, ANDREW TUITE, a citizen of the United States, residing at Vincennes, in the county of Knox, State of Indiana, have invented certain new and useful Improvements in Pot-Furnaces; and I do hereby declare the following to be a full, clear, and exact description of the invention, such as will enable others skilled in the art to which it appertains to make and use the same.

This invention relates to pot furnaces adapted for use in connection with glass drawing apparatus.

The invention resides in the production of a pot furnace of the type indicated which includes a pair of drawing pots disposed in opposite ends thereof and which may be readily revolved so that when one pot has been emptied the other may be drawn upward for the reception of a new supply of molten glass and the formerly used pot will be turned downward into the stationary furnace so that the remnant of glass adhering to the bottom and walls thereof will be melted and permitted to drop down away from it.

Heretofore double drawing pots adapted for rotation have been constructed or formed with a common bottom and positioned in a stationary furnace for rotation therein so as to successively change the position of the double cavities of the pots. This construction has been found unsatisfactory, inasmuch as it has been necessary in order to revolve the pots to either shift same in a vertical direction before attempting the rotation thereof or to provide the stationary furnace with removable top stone sections which must be manipulated to other than their normal position before the rotation of the pots can be effected. A further objection to the structure just enumerated is present in the constant tendency of the fire to pass up between the sides of the pot and the inner face of the lining of the furnace which is a very bothersome and undesirable condition during the operation of drawing the glass.

It is therefore the object of the present invention to obviate the objections and unsatisfactory conditions previously mentioned and to this end the invention consists in constructing a rotatable furnace of cylindrical formation which carries at each end thereof a drawing pot interlockingly engaged in a suitable manner with the refractory lining of the furnace, and in providing means whereby fuel may be supplied into the combustion chamber of the furnace which is disposed between the respective bottoms of the drawing pots carried thereby, without interfering with the free rotation of the furnace.

The foregoing objects and the other improvements constituting this invention will be more fully understood from the following description and accompanying drawings in which like characters of reference denote corresponding parts in the several views, and in which, Figure 1 is a top plan view of the invention; Fig. 2, a vertical section on the line 2—2 of Fig. 1; Fig. 3, a side elevation; and Fig. 4, a section on the line 4—4 of Fig. 2.

In the drawings, the revolving furnace is shown as constructed of refractory material such as clay blocks and the like which is inclosed by the boiler iron shell 5. The refractory lining of the furnace is formed of four separate semi-circular sections 6, 7, 8 and 9 which are detachably secured to the shell 5 in any suitable manner so as to permit their ready removal and application, for a purpose to be hereinafter described. It will be understood that the sections 6 and 7 are disposed in vertical alinement on one side of the furnace while the sections 8 and 9 are correspondingly disposed on the other side of the furnace so that the sections 6 and 8 and the sections 7 and 9 will be in the same horizontal plane, respectively. The section 6 is provided with an annular groove 10, while the section 8 is provided with a corresponding annular groove 12. A drawing pot 14 is provided with an annular flange 15 adapted to enter the recesses 11 and 12 to produce an interlocking, fire-tight, engagement between the refractory lining of the furnace and the drawing pot and thus prevent the possibility of the escapement of fire between the lining and said pot, and at the same time serves to secure the pot in desired position. Likewise, the sections 7 and 9 are formed with annular grooves 16 and 17 for the reception of an annular flange 18 formed on the drawing pot 19, whereby said pot is supported and a fire-tight engagement between the pot 19 and the lining of the furnace is had. As sections 6 and 8 and sections 7 and 9 are removable from the shell 5 it will be obvious that should either of the drawing pots 14 or 19 become broken the sections and the pot in engagement therewith can be easily taken out and a new pot replaced in said sections and the whole reapplied to the lining 5.

Centrally of the cylindrical shell 5 and at diametrically opposite points therein are bolted the shaft boxes 20 and 21, each of which is threaded internally to receive the threaded ends of the hollow journal shafts 22 and 23 respectively, the outer end of the journal shaft 22 being mounted for rotation in the upright journal bracket 24 while the journal shaft 23 is similarly mounted in the bracket 25. The journal shaft 23 is somewhat longer than the journal shaft 22 and has mounted thereon in a fixed manner adjacent the journal bracket 25 a ratchet wheel 26, while a lever 27 loosely mounted on said shaft 23 carries thereon a pawl 28 adapted for engagement with the teeth of the ratchet wheel 26 during the movements of the lever in one direction. It will thus be apparent that in order to rotate the furnace so that the positions of the drawing pots 14 and 19 will be reversed from what is shown in Fig. 2 it is only necessary to grasp the lever 27 and oscillate same on its pivot; the movement of said lever in one direction serving to rotate the ratchet wheel 26 which in turn rotates the journal shaft 23 and produces a corresponding rotation of the furnace. Continued operation of said lever will of necessity eventually reverse the position of the drawing pots 14 and 19. The shell 5 and the lining of refractory material are each correspondingly provided with oppositely located horizontal apertures 30 and 31 which open into the combustion chamber 32 located between the bottoms of the pots 14 and 19, said apertures also registering respectively with the bores of the journal shafts 22 and 23.

In order to supply fuel to the chamber 32 a pipe line 33 leads from a suitable gas supply and passes by means of a suitable angle section 34 through the bore of the journal shaft 22 into the combustion chamber 32 of the furnace. The section 34 is connected to the main gas pipe line 33 by means of the T-coupling 35 and an air pipe line 36 leading from a suitable compressed air supply is inserted through said coupling and into the bore of the section 34 of the gas pipe line to effect a suitable mixture of air and gas and thus increase the efficiency of the combustion in the chamber 32. Fuel is also supplied to the chamber 32 by way of the bore of the journal shaft 23 and as the pipe lines which conduct the fuel and air through the bore of this shaft are precisely the same in construction as those which extend through the bore of the shaft 22 a detail description thereof will be omitted herein. The pipe lines 33 and 36 are provided with suitable valves 37 and 38 respectively for controlling the passage of air and gas therethrough and similar valves are also supplied in the pipe lines which leads through the bore of the journal shaft 23.

Disposed directly beneath the revolving furnace heretofore described is a stationary furnace 39 which is provided with a centrally disposed partition 40 having a central aperture 41. Suitable gas and air supply pipes 42, 43, 44 and 45 are in the combustion chamber of said stationary furnace above the partition 40. By reference to Fig. 2 it will be obvious that when the pot 19 is disposed above the stationary furnace 39 it will occupy an inverted position and the entire interior thereof will be subjected to the heat of the combustion which takes place in the furnace 39 which will melt any remnant of glass adhering to the bottom or walls thereof so as to permit same to flow downward under the influence of gravity and drop upon the partition 40 from whence it will pass through the aperture 41 into a suitable receptacle and be ready for future use.

It will be understood that the rotatable furnace is disposed a sufficient distance above the stationary furnace to permit a free rotation thereof without interference by the latter. It will also be desirable in assembling the stationary and rotatable furnaces to provide the rotatable furnace with an adjustable band with suitable means for raising and lowering same, whereby the space between the rotatable furnace and stationary furnace can be closed to prevent the escape of fire and heat by way of the space therebetween. In such a structure it will be understood that when it is desired to revolve the rotatable furnace the band will be raised so as to give sufficient clearance between same and the stationary furnace.

What is claimed is:—

A pot furnace comprising a shell having a plurality of melting pots included in its wall, tubular journal shafts secured to said shell at opposite points and affording communication with the interior thereof, means for introducing a heating medium through said journal shafts into the interior of the shell, journal brackets supporting said journal shafts respectively, whereby said shell is rotatably mounted, a ratchet wheel fixed on one of said journal shafts, a lever loosely mounted on said journal shaft adjacent the ratchet wheel, and a pawl carried by the lever and operatively engaged with the ratchet wheel for effecting the rotation of the journal shaft and shell when said lever is moved in one direction.

In testimony whereof, I affix my signature, in presence of two witnesses.

ANDREW TUITE.

Witnesses:
B. F. WHEELER,
JAMES M. HOUSE.